3,399,022
ANNULAR BURNER APPARATUS PROVIDING BLUE-FLAME COMBUSTION OF DOMESTIC FUEL OIL
Frank W. Bailey, Wayne, N.J., assignor to Operation Oil Heat Associates, Inc., New York, N.Y.
Filed Jan. 23, 1967, Ser. No. 610,848
12 Claims. (Cl. 431—116)

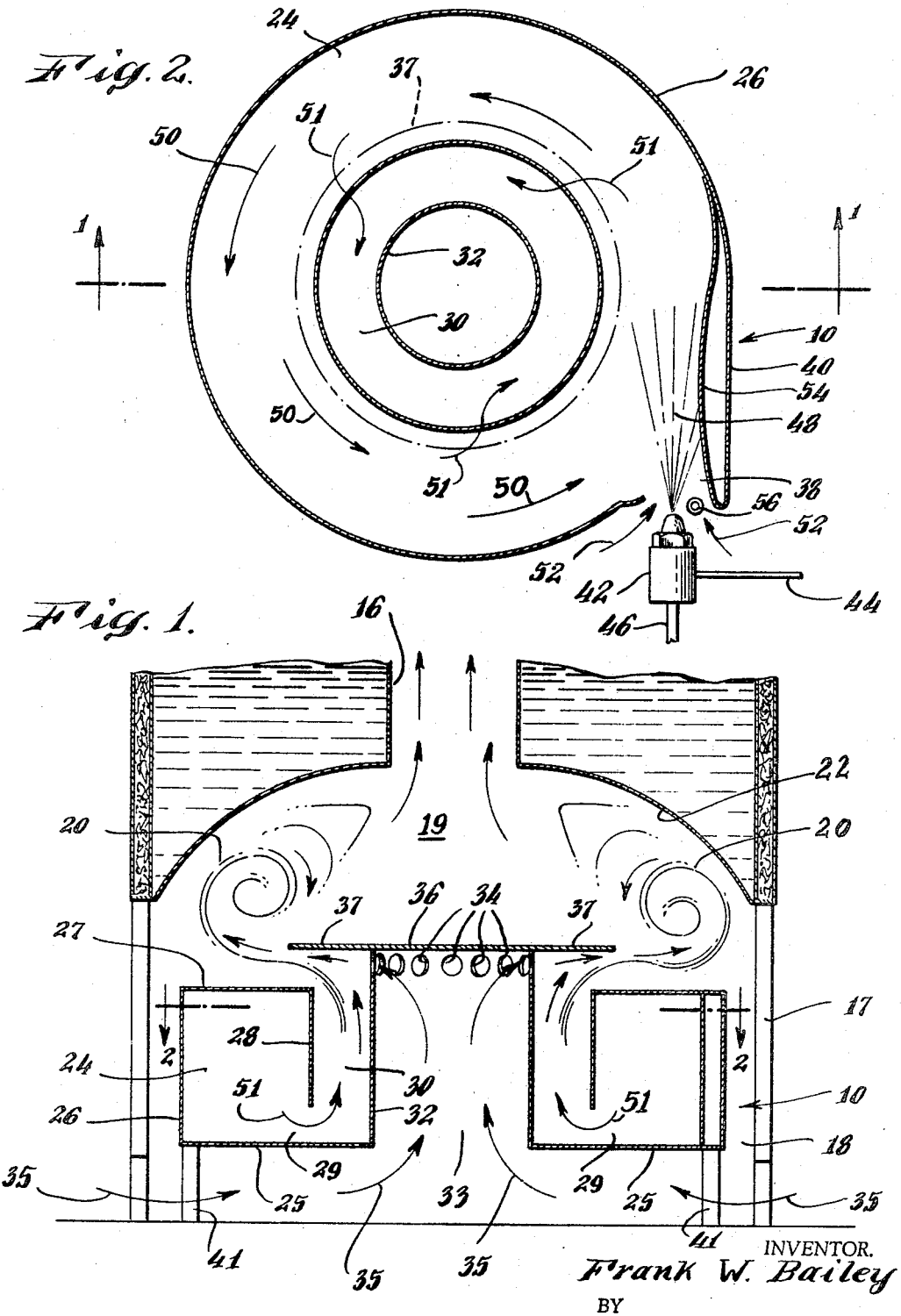

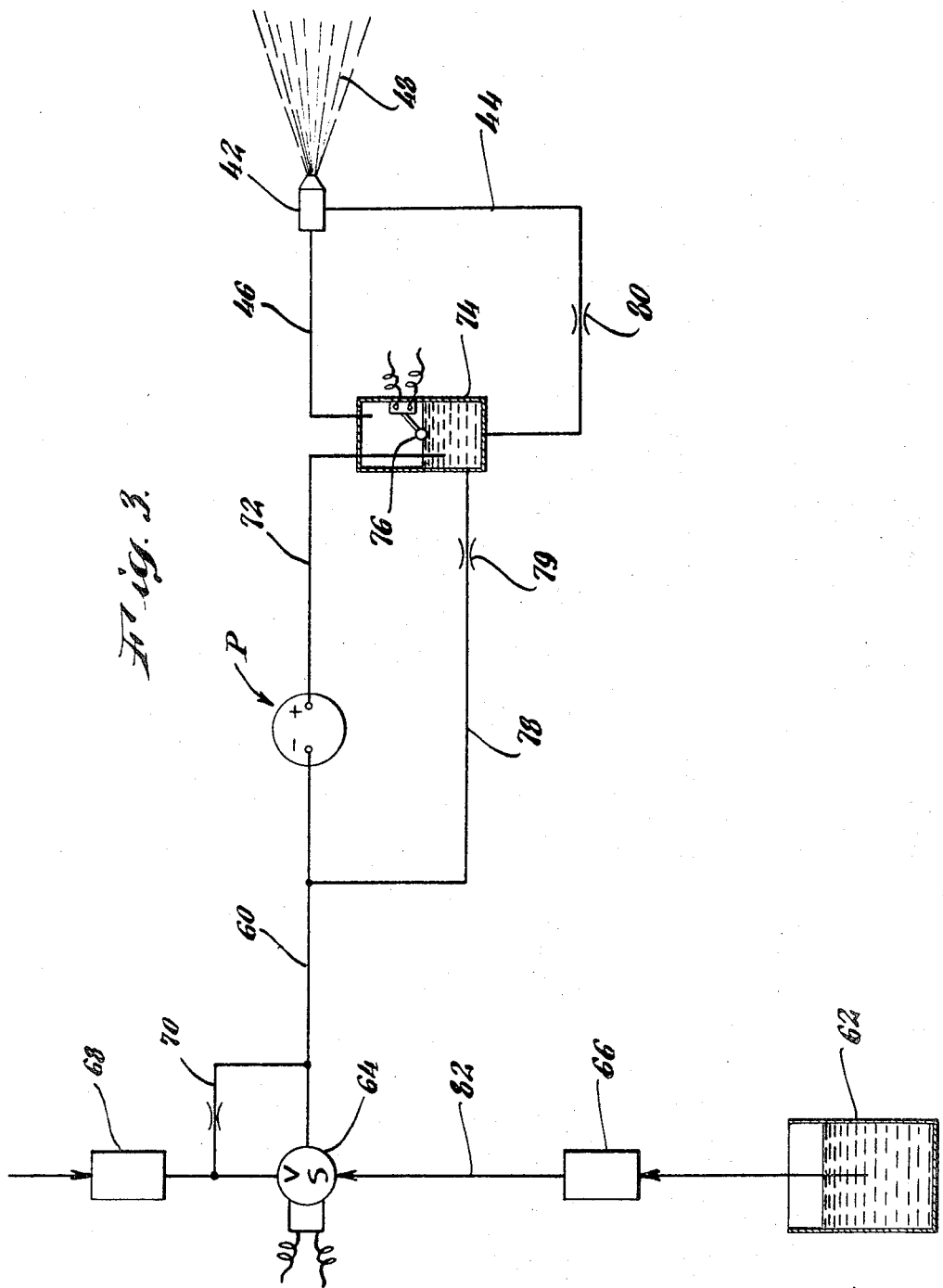

ABSTRACT OF THE DISCLOSURE

An annular burner defines a relatively long recirculation path through which combustion gases circulate back to the inlet for intimate mixing with and dilution of the unburned mixture as it enters the path for controlling the rate of burning to provide blue-flame combustion. The air-cooled wall means defining the recirculation path cool the combustion gases to promote blue-flame combustion, and an air-cooled axial duct cools the flaming gases which issue from the recirculation path along an outlet passageway extending substantially around the duct. The preheated air from the upper end of the duct is directed outwardly to mix with and complete blue-flame combustion of the flaming gases rising around the duct. A Coanda flow augmentation surface near the entry stabilize the pattern of the unburned mixture and promotes intimate mixing with and dilution by the recirculated combustion products.

---

The present invention relates to an annular burner apparatus providing blue-flame combustion of domestic fuel oil. More particularly, this invention relates to an annular burner of compact configuration achieving blue-flame combustion at relatively high firing rates per hour of domestic fuel oil consumed.

This burner as described is particularly well suited for use in the home in conjunction with various heating appliances and the illustrative embodiment shown is adapted for use with domestic water heaters of the type having a heat release chamber at the bottom with a central flue or duct extending up along the axis of the tank containing the water to be heated.

In the commercial market today, as a practical matter, the home owner or builder has a choice of only two types of water heaters for heating domestic hot water. These are the electric heater and the gas-fired heater. Although there are water heaters which are arranged to be fueled by domestic fuel oil, these heaters have generally been large and bulky, being the result of attempting to adapt a home-heating gun type furnace burner to a water tank. These prior oil-fired water heaters produce a yellow-flame combustion which leads to soot deposition with all of its consequent problems and introduces a source of dirt into the home. In view of the soot problem, bulkiness, high expense, and the generally higher noise level and unduly large heat release of these gun burner types of oil-fired water heaters, they are not generally suited to home installations.

Among the further shortcomings of the prior oil-fired water heater burners are those resulting from the fact that the combustion has generally been of the yellow-flame type which results in the release of a substantial amount of soot. This soot becomes deposited upon the heat exchange surfaces of the associated equipment, and to some extent there is the problem of soot entering into the living quarters of the home. In addition, yellow-flame combustion is characterized by a generally uneven flame geometry which is violent and noisy, leading to the possible generation of "hot spots" on the heat exchange surface. These factors aggravate an external corrosion of the heat exchange surfaces and can lead to an internal lime deposition problem within the water tank itself. As a result of these limitations and drawbacks, the oil-fired water heater to date has achieved only a very limited market acceptance as compared to the electric and gas-type heaters.

In addition, it is noted that even though oil burners have been used for decades there has been no compact blue-flame burner for domestic fuel oil available prior to this invention for use in domestic appliances such as water heaters, clothes driers and the like.

Accordingly, it is an object of the present invention to provide a novel burner of annular configuration which will produce blue-flame combustion when fired with domestic No. 2 oil and which is suitable for use in the home in heating appliances such as water heaters, clothes driers, and the like.

Among the many advantages of the annular burner of the present invention are those resulting from the fact that this burner provides a clean, quiet blue-flame combustion and yet achieves a high volumetric heat release. To my knowledge this is the most compact burner which produces a blue-flame combustion at a firing rate of the order of 0.4 gallon per hour. In accordance with the present invention there is a controlled degree of recirculation of the combustion products so that at least 40 percent by mass of these combustion products are returned and introduced into and intimately combined with the fresh fuel mixture to be burned. This recirculation is achieved by initially swirling the burning mixture through an annular space in the burner returning to the incoming flow of fresh fuel, as will be explained in detail in the specification further below.

Further advantages of the burner of the present invention are those resulting from the fact that the burner structure provides temperature control over the products in the combustion volume. There are generally concentric inner and outer and upper and lower heat exchange wall means surrounding the annular volume, and these walls provide control over the temperature of the combustion products. An advantage of the annular burner described is that it is adapted to be scaled up or down for changing the firing rate for various applications. In addition, the burner of the present invention provides an orderly flame distribution within the volume to be heated. Only a minimum amount of flame occurs in the pilot zone, and most of the heat release occurs in the desired chamber away from the piloting volume. Also, the flame is spread uniformly in an annular pattern for convenient application to the heat exchange surfaces of a domestic appliance, such as to the base of the water heater. Thus, this flame pattern accommodates itself readily to release heat efficiently within a hemispherical chamber such as is located at the base of a water heater storage tank as now used with gas burners. It is not necessary to redesign these tanks which are available, the burner of the present invention is readily accommodated thereto in an efficient, compact unit which is attractive for home installation.

Among the further advantages of the burner of the present invention are those resulting from the fact that it is capable of use without requiring the provision of a secondary air fan. All of the required air is supplied by or induced to flow into the burner by the fuel atomizing nozzle. However, if desired this burner can be used with a secondary air fan. In addition, the combustion produced is so efficient that a high carbon dioxide and a low carbon monoxide content is present in the products, and the flame geometry and controlled heat release is such that there is no need for the use of expensive high-temperature alloy materials or of insulating materials in the burner structure itself.

In summary, the advantages flowing from this invention are as follows:

(1) *Low noise level.*—An extremely quiet operation is provided as a result of the blue-frame combustion process which is controlled and shaped by the burner geometery.

(2) *Desirable flame geometry.*—The volume and configuration of the flame and its overall uniformity are well suited for use in a domestic heating appliance, particularly in a water heater.

(3) *Versatility of flame shaping.*—The blue flame which is produced is adapted to be deflected into various desired shapes as required by the heat release chamber associated with a domestic appliance, such as a water heater, as to match the flame geometry closely with the structure of the heat exchanger.

(4) *Flame stability.*—The geometry of the burner provides a flame which is shielded and controlled so as to resist being blown out by reverse drafts coming down through the central duct of the water heater.

(5) *Simplicity in construction.*—This burner can be constructed from light, inexpensive sheet metal stampings and is relatively small and does not require a fan for secondary air, although such a fan may be used if desired.

(6) *Low cost.*—The burner itself and its installation are low in cost, and in addition the burner can be operated satisfactorily by inexpensive, reliable, simple auxiliary equipment, as will be described.

(7) *Wide firing range of operation.*—This burner can be operated over a relatively wide firing range up to and including 0.4 gallon per hour of No. 2 fuel oil.

In this specification and in the accompanying drawings are described and shown the annular burner apparatus of the present invention providing blue-flame combustion of domestic fuel oil, and it is to be understood that this illustrative embodiment of the invention is not intended to be exhaustive nor limiting of the invention, but on the contrary it is set forth so that those skilled in the art will fully understand the invention and will appreciate how this burner can be adapted and modified to meet the conditions of a particular heat exchanger in a domestic appliance or similar application.

The various objects, aspects and advantages of the present invention will be more fully understood from a consideration of the following description in conjunction with the accompanying drawings, in which:

FIGURE 1 is an elevational sectional view of the annular burner of the present invention installed for use with a water heater storage tank of the central flue type;

FIGURE 2 is a sectional view of the burner of FIGURE 1 taken along the plane 2—2 of FIGURE 1 looking downwardly; and FIGURE 3 is a schematic diagram of a circuit for supplying the fuel and air to the burner of the present invention.

Referring to the drawings in greater detail, the annular blue-flame burner apparatus of the present invention is generally indicated at 10, this burner being shown as installed in a hot water heater 12. This heater 12 includes a hot water storage tank 14 having a central flue 16 extending up through the tank 14 along its axis. This hot water heater tank is of the conventional configuration as now used in gas-fired water heaters, having an insulation jacket 15, and being supported upon a structure 17 defining a space 18 for receiving a burner. The axial duct 16 serves as a flue passage for the combustion products and is a heat exchange surface for heating water in the tank 14. The upper portion of the bottom space 18 includes a hemispherical combustion and heat-release chamber 19 which is positioned directly beneath the tank 14 and communicates with the lower end of the axial duct 16.

In operation, the burner 10 produces an annular blue flame, generally indicated at 20, which is uniformly distributed around near the perimeter of the hemispherical chamber 19, and this blue flame washes upwardly along the concave curving heat exchange surface 22 at the lower end of the water tank 14.

The burner 10 includes an annular recirculation chamber 24 which is defined by a lower annular pan 25, an outer cylindrical shell 26, and an annular wall plate 27. Attached to this annular wall 27 is a cylindrical wall 28 which surrounds a duct 32 extending upwardly about the central axis of the burner, with this wall 28 and duct 32 defining therebetween an outlet passageway 30 from the recirculation path 24. In this illustrative example of the burner 10 the wall 28 extends downwardly about the duct 32 so as to reduce the over-all height of the burner 10, and the lower edge of the wall 28 provides an inverted cylindrical lip which extends down toward and is spaced from the lower pan 25 so as to define a bottom outlet port 29 extending substantially completely around the axis of the burner. In this embodiment the lower edge of the wall 28 projects down a distance equal to more than 50% of the overall height of the annulus 24 for reasons as explained further below. An advantage of the reduced height provided by the downwardly extending wall 28 is that the resulting compact configuration is well suited to a water heater application as shown.

The bottom outlet 29 communicates with the upwardly extending concentric annular outlet passageway 30 running up between the wall 28 and the central duct 32. The central duct 32 flares outwardly at its upper end to form an outwardly extending deflector portion 37 and is covered by a top 36. The duct 32 includes a number of small outlet ports 34 near its upper end. At the lower end of the duct 32 is an entrance 33 for tertiary air 35 to be convected up through this duct. The burner apparatus 10 is supported on struts or legs 41 so as to allow clearance for this tertiary air 35 to flow inwardly beneath the pan 25.

The ports 34 are located beneath the outwardly extending deflector portion 37 which is thereby air-cooled. In this example the duct 32 flares out at 37 so that it extends outwardly radially beyond the diameter of the wall 28. The projecting portion 37 serves to deflect the blue flame 20 outwardly above the top plate 27 to produce the annular flame vortex configuration 20 as shown.

A generally tangential inlet extending into the annular combustion and recirculation space 24 is defined by a wall 40 tangential to the shell 26. An atomizing nozzle 42 of conventional type in which a jet of air serves to atomize the fuel is positioned near the inlet 38 and is supplied with No. 2 fuel oil through a fuel line 44 and with compressed air of relatively low pressure through an air pipe 46. The atomized spray and primary air 48 from the nozzle 42 enter through the inlet 38 into the annular region 24 to produce a swirling motion of the combustion occurring therein as indicated by the flow arrows 50. The air supplied through the pipe 46 is referred to as the primary air for atomizing the fuel, and the flow of the atomized fuel and air mixture spray 48 passing into the inlet 38 induces a flow of secondary air 52 entering through the inlet 38 as indicated by the flow arrows.

In order to stabilize the flow of the spray 48 and to augment its induction of the secondary air flow 52 there is a Coanda surface 54 positioned adjacent to one side of the conical spray pattern 48. This Coanda surface 54 is convex toward the spray pattern 48 so that the rapidly moving flow pattern 48 creates a low pressure region immediately adjacent to and extending along the surface 54. Thus, the amount of secondary air 52 which is induced to flow by this spray pattern 48 is increased by the interaction with the Coanda surface 54. There is an intimate mixing of the primary and secondary air with the fine droplets of fuel in the spray 48.

Positioned inside of the inlet 38 is a spark plug igniter 56 which is of conventional type and is energized by a conventional ignition transformer providing a suitable high voltage potential, for example, 10,000 volts.

It is noted that all of the parts of the burner 10 can readily be fabricated from inexpensive metal stampings, for example, such as cold rolled steel which are welded together to construct the burner.

In operation the mixture of burning fuel and air circulating around through the annular space 24 in the flow path 50 is intimately mixed with the incoming fresh fuel-air mixture so that the fresh mixture is diluted by at least 40% by mass of the returned combustion products 50. That is, for every 100 parts of mass of fresh fuel and air mixture 48, there are at least 40 parts of mass of the combustion products mixed therewith. This dilution of the unburned mixture with combustion products serves to slow down and to control the combustion kinetics within the annular recirculation space 24 and hence promotes the desired blue-flame combustion instead of yellow-flame combustion. This 40% figure is the practical lower limit for blue-flame operation. Below this limit a yellow flame almost immediately appears, and the desired flame pattern 20 is disturbed.

It is noted that the present invention provides a novel arrangement for controlling the blue-flame combustion process by controlling the combustible mixture composition and its temperature within the burner configuration. Since the combustion kinetic processes proceed at a rate which is governed by an Arrhenius type of exponential temperature dependence, it is my theoretical conclusion that a blue flame oil burning device should achieve a temperature equilibrium quickly and uniformly. It should also maintain the desired temperature condition over a relatively large range of firing rates. Burner configurations which do not attain temperature equilibria quickly generally exhibit erratic ignition characteristics and smoke generation during the ignition period, due to the fact that a smaller fraction of liquid fuel is gasefied and prepared for combustion, resulting in a "lean" condition within the piloting burner volume, and a shifting mixture composition, irregular flame geometry, and firing rates during this transition period.

Likewise, burner configurations having relatively non-uniform temperature distribution may accelerate the combustion kinetics in the vicinity of hot spots, resulting in the development of a yellow flame process. The burner apparatus of the present invention herein disclosed provided for substantially uniform convective cooling on the inner and outer annulus of the burner shell, resulting in the maintenance of proper temperature conditions. The internal swirl of the combustible mixture and combustion products also contributes to a relatively uniform temperature distribution. By avoiding the use of small flame ports through the burner shell, for example such as disclosed in U.S. Patent No. 3,137,338, hot spots in the burner shell tend to be avoided, and thus blue-flame, rather than yellow-flame combustion is produced, with the attendant advantages described above.

A controlled amount of heat is withdrawn by the presence of the walls 25, 26, 27 and 28, serving to slow down and to control the combustion occurring within the annulus 24. In effect, this annular burner configuration provides a relatively large surface-to-volume ratio, so that a controlled amount of heat is withdrawn from the space 24 into these convectively cooled walls 25, 26, 27 and 28. Thus, a controlled blue-flame combustion process occurs within the space 24.

By virtue of the fact that the edge of the wall 28 projects down, a controlled amount of the combustion escapes through the bottom outlet 29 as indicated by the arrows 51, and the required amount of combustion products 50 are caused to recirculate back into the incoming mixture 48.

The Coanda surface 54 stabilizes the incoming mixture 48 to hold it in position for intimate mixing with and dilution by the recirculating products 50, thereby promoting more intimate and thorough mixing with the recirculating combustion products. Also, the Coanda surface 54 provides another advantageous function. To explain this additional function it is noted that an unsymmetrical flow condition is created in the vicinity of the fuel atomization and injection inflow region 52, 38, as compared with the symmetry existing elsewhere in the annular path 24.

In order to have a relatively long injection path through the burner annulus and avoid excessive wall wetting during the starting transition, it is desirable to align the atomizer element 42 along a path which generally defines the maximum uninterrupted mixing and atomization distance through the annular volume of the burner configuration. As shown in FIGURE 2, this involves aligning the atomizer element 42 generally parallel and somewhat inward from a burner wall 40 which tangentially intercepts and becomes integral with the outer shell 26 of the annular burner configuration at its first quadrant. In the absence of a Coanda surface 54 a flow reversal of combustible mixture may occur along the wall of the burner configuration to the relatively low static pressure region in the vicinity of the atomizer element. Due to the non-symmetry of the system, the combustible mixture which is allowed to recirculate in this manner is not diluted with inert combustion products 50 so that this parcel of mixture is susceptible to pulsating type yellow-flame combustion. It has been found in practice that the flow disturbances emanating from this local combustion pulsation provides a regenerative feedback action with the adjacent streams of atomized combustible mixture and recirculating combustion products. The use of a Coanda surface 54 prevents the development of a negative boundary layer along the wall of the combustion chamber in the vicinity of the atomizer element thereby obviating the aforementioned difficulties.

The convection of tertiary air up through the duct 32 and out through the ports 34 is augmented by a low pressure region created along the lower surface of the projecting rim 37 caused by the outward deflecting of the flame 20 below the baffle 36. Thus, the tertiary air flows out along the lower surface of the baffle 36 so as to keep it cool.

The major proportion of the combustion and the major proportion of the heat release occur at a region remote from the piloting combustion in the annulus 24, that is, the major combustion and heat release occur in the annular flame 20 which extends throughout the perimeter of the hemispherical chamber 19 and washes up along the concave heat exchange surface 22.

The fuel supply to the line 44 and the low pressure compressed air in the pipe 46 may be obtained from any suitable supply system. An inexpensive and reliable fuel and air supply system is shown in FIGURE 3, which utilizes a liquid-ring pump P, as disclosed in detail and claimed in my copending application Ser. No. 430,147, filed Feb. 3, 1965. The suction side of the pump is indicated by a negative (—) sign and the discharge pressure side by a plus (+) sign. In this pump P the fuel is used as a liquid-ring sealant, and an intake fuel line 60 is connected to the suction side of the pump for feeding fuel from a fuel storage tank 62. This fuel supply connection is made through a three-way solenoid valve 64 and a fuel strainer 66. The air is drawn in through an air filter 68, and there is an air-bleed connection 70 having a metering orifice which by-passes the valve 64 so that a sufficient quantity of air is always being supplied to the pump P and thus is always being supplied to the air-atomizing nozzle 42.

From the discharge pressure side of the pump a line 72 feeds into a small air-oil separating chamber 74 which contains a float-actuated mercury switch 76. Through this line 72 the pump P feeds low pressure compressed air together with fuel oil, the air pressure being of the order of a few inches of water. An oil by-pass bleed connection 78 extends from the bottom of the separator 74 back to the pump intake line 60. From the top of the separator 74, a pressurized air supply pipe line 46 runs to the burner nozzle 42 for aspirating and atomizing the fuel into the spray 48 of fine fuel droplets carried by a flow of primary air. The fuel to be burned is fed from the bottom of the separator 74 through a metering orifice 80 and a line 44 into an air-atomizing venturi passage within the nozzle 42.

When fuel is required to replenish the supply in the small separating chamber 74, the solenoid valve 64 is actuated by the float-controlled switch 76. The valve 64 normally shuts off a fuel supply line 82 from the tank 62 and applies the full capacity of the pump P to draw air through the intake filter 68. When the valve 64 is actuated by the switch 76, as discussed above, then the suction in line 60 is applied to the fuel line 82 so that a portion of the pump capacity is used to pump fuel. This enables the use of a single pipe system, and it makes the burner insensitive to the relative level of fuel in the storage tank 62. The oil-air separating chamber 74 prevents any instability in the air-atomizing nozzle 42 by avoiding liquid carry-over with the compressed air in the pipe line 46. The oil by-pass connection 78 allows the pump P to recycle a small portion of the fuel oil so as to minimize its effective clearance volume and to maintain a liberal oil film between the moving parts of the pump for additional sealing and lubrication action, as is explained in detail in said copending application.

From the foregoing it will be understood that the annular burner apparatus providing blue flame combustion of domestic fuel oil described above is well suited to provide the advantages set forth and since various embodiments may be made of the features of this invention and as the structure herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as defined by the following claims.

What is claimed is:

1. Annular burner apparatus providing blue-flame combustion of domestic fuel oil comprising wall means defining a recirculation chamber of generally annular configuration providing a recirculation path encircling a central vertical axis of the apparatus, said wall means defining an inlet mouth positioned generally tangentially with respect to said recirculation chamber adapted to have a fuel oil spray nozzle associated with said inlet mouth for spraying fuel oil into said recirculation chamber in a direction generally tangentially with respect to said annular chamber, said burner apparatus admitting air through said inlet mouth to mix with said fuel spray forming a fuel-air mixture, means for igniting said fuel-air mixture producing combustion products intensely swirling along said recirculation path around said axis and travelling back to said inlet mouth for intimately mixing the recirculated combustion products with the fresh fuel-air mixture being supplied through said inlet mouth to dilute said fresh mixture with the recirculated combustion products, said burner apparatus having a duct extending upwardly around the central axis, and the lower end of said duct being arranged to have air supplied thereto flowing upwardly through said duct, said recirculation chamber having an outlet therefrom near said duct and extending substantially around said axis permitting flaming gases to flow upwardly around said duct, and the upper end of said duct flaring outwardly for deflecting outwardly the upwardly flowing flaming gases, and the air rising through said duct flowing upwardly and outwardly from the upper end of said duct and mixing with the flaming gases for providing an annular blue flame in the region above said burner apparatus.

2. Annular burner apparatus as claimed in claim 1 in which said duct has a plurality of ports therein below its outwardly flaring upper end and the air rising through said duct passes outwardly through said duct and is deflected outwardly by the flaring upper end of the duct to mix with the flaming gases.

3. Annular burner apparatus as claimed in claim 1 and including a surface connected to said wall means and being concentric with said duct and encircling said duct and spaced from said duct, said surface and said duct defining an annular passageway extending from said outlet upwardly between said surface and duct conducting the flaming gases upwardly around said duct.

4. Annular burner apparatus as claimed in claim 3 and wherein said concentric surface extends downwardly to form an inverted lip extending downwardly from an upper portion of said annular wall means, said inverted lip defining said outlet near the bottom of said recirculation chamber.

5. Annular burner apparatus as claimed in claim 1 and including a Coanda flow augmentation surface positioned adjacent to said inlet mouth, said Coanda surface being located at a greater radial distance from the axis than the spray pattern from said spray nozzle and being curved convex inwardly toward said spray pattern augmenting the flow of air through said inlet mouth and stabilizing said spray pattern for maintaining said spray pattern in position to be intimately diluted by and mixed with said recirculated combustion products.

6. Annular burner apparatus as claimed in claim 1 in which said wall means and said duct are cooled by flowing air, and the combustion gases swirling in said recirculation chamber along said recirculation path are cooled by said wall means and by said duct for maintaining substantially uniform temperature conditions suitable for blue-flame combustion.

7. Annular burner apparatus providing blue-flame combustion of domestic fuel oil comprising means defining an inlet mouth for an oil spray pattern to pass through said mouth into said burner apparatus and to be mixed with air, wall means defining a recirculation path beginning at a region approximately tangential to said spray pattern, extending around a vertical axis and returning to said region, ignition means for igniting the mixture of fuel spray and air near said region partially burning the fuel in said recirculation path and returning combustion products along said recirculation path to said region for intimate mixing with and dilution of the fuel-air mixture, duct means extending upwardly along the axis of the burner apparatus, said duct means being surrounded by said recirculation path, said wall means providing an outlet from said recirculation path substantially surrounding said duct means for flaming gases to issue from said recirculation and to rise around said duct means, said duct means being arranged for air to flow upwardly therethrough, generally axially of the burner, and the upper end of said duct means being arranged for deflecting the upwardly flowing air outwardly into said rising flaming gases providing blue-flame combustion in a pattern above the burner apparatus and surrounding the burner axis.

8. Annular burner apparatus as claimed in claim 7 and wherein said wall means define a path for convection air to flow inwardly beneath said recirculation path and upwardly along the axis through said duct means, whereby said convection air cools said wall means and said duct means and thereby becomes preheated before entering into combustion with said rising flaming gases, and the combustion gases in said recirculation path are cooled by said wall means to provide suitable conditions for blue-flame combustion of the fuel oil.

9. Annular burner apparatus as claimed in claim 7 and in which said wall means include a wall surrounding said duct means and spaced from said duct means defining an outlet passageway extending upwardly around said duct means for flaming gases to issue from said recirculation path and to rise up said outlet passageway.

10. Annular burner apparatus as claimed in claim 7 in which said inlet mouth includes a curved surface located on the opposite side of said spray pattern from the place where said recirculation path returns to said region, said curved surface being convex toward said spray pattern to stabilize the incoming spray pattern for promoting more intimate mixing of the unburned mixture with and dilution by the recirculated combustion products, thereby to control the temperature of the combustion in said recirculation path for providing blue-flame combustion.

11. Annular burner apparatus for providing blue-flame combustion of domestic fuel air comprising heat conductive wall means defining a relatively long annular recirculation path extending around a vertical axis, said wall means including an inlet mouth through which a mixture of unburned fuel and air enters said annular recirculation path, ignition means for igniting the fuel-air mixture, said burner having a duct of heat conductive material extending upwardly around said vertical axis, said wall means defining an outlet from said annular recirculation path extending substantially around said duct and being located near said duct for flaming gases to rise upwardly around said duct, said duct being arranged for air to flow upwardly therethrough cooling said duct and said wall means being externally exposed to the air for cooling said wall means, combustion gases in said recirculation path returning to said inlet mouth and mixing with and diluting the mixture of unburned fuel and air for controlling the burning rate and said air-cooled heat conductive wall means and said air-cooled duct providing cooling of the combustion gases in said recirculation path for controlling the burning rate to provide blue-flame combustion in said recirculation path, and the air flowing from the upper end of said duct mixing with the flaming gases rising around said duct for providing blue-flame combustion in the region around and above the upper end of said duct means.

12. Annular burner apparatus providing blue-flame combustion of domestic fuel oil comprising heat conductive metal wall means defining a relatively long annular recirculation space extending around a vertical axis, said wall means defining a generally tangential inlet mouth extending into said annular recirculation space, a fuel oil atomizing nozzle positioned near to said inlet mouth and adapted to be supplied with No. 2 fuel oil for supplying atomized fuel-spray into said annular recirculation space in generally tangential relation to said annular recirculation space, said inlet mouth allowing the induction of secondary air with said fuel spray for forming a mixture of unburned fuel and air, ignition means for igniting the fuel-air mixture producing combustion products traveling along said annular recirculation space travelling around said axis and returning to the region of said inlet mouth for intimately mixing the recirculated combustion products with the unburned fuel-air mixture being supplied through said inlet mouth to dilute said unburned fuel-air mixture by at least 40% by mass of the recirculated combustion products for controlling the burning rate, said burner having a duct of heat conductive metal extending upwardly around said vertical axis, said wall means defining an annular outlet from said annular recirculation path extending substantially around said duct and being located near said duct for flaming gases to rise upwardly in an annular path around said duct, said heat conductive duct being arranged for air to flow upwardly therethrough cooling said duct, and said heat conductive wall means being externally exposed to the air for cooling said wall means, said air-cooled heat conductive wall means and said air-cooled duct providing cooling of the combustion gases in said recirculation path for controlling the burning rate to provide blue-flame combustion in said recirculation path, and the air flowing from the upper end of said duct mixing with the flaming gases rising around said duct for providing blue-flame combustion in the region around and above the upper end of said duct means.

References Cited

UNITED STATES PATENTS

| 1,091,475 | 3/1914 | Best | 158—4 |
| 1,747,191 | 2/1930 | Steedman | 158—1 |
| 2,136,317 | 11/1938 | Rialdini | 158—4 |
| 3,137,338 | 6/1964 | Biber et al. | 158—76 |

FOREIGN PATENTS 85,052  2/1958  Denmark.

FREDERICK L. MATTESON, Jr., *Primary Examiner.*

E. G. FAVORS, *Assistant Examiner.*